(12) United States Patent
Koravadi

(10) Patent No.: US 10,040,481 B2
(45) Date of Patent: Aug. 7, 2018

(54) VEHICLE TRAILER ANGLE DETECTION SYSTEM USING ULTRASONIC SENSORS

(71) Applicant: MAGNA ELECTRONICS INC., Auburn Hills, MI (US)

(72) Inventor: Krishna Koravadi, Rochester Hills, MI (US)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 0 days.

(21) Appl. No.: 15/596,350

(22) Filed: May 16, 2017

(65) Prior Publication Data

US 2017/0334484 A1 Nov. 23, 2017

Related U.S. Application Data

(60) Provisional application No. 62/337,575, filed on May 17, 2016.

(51) Int. Cl.
*B62D 15/02* (2006.01)
*G06K 9/00* (2006.01)
*G01S 15/93* (2006.01)
*G08G 1/16* (2006.01)

(52) U.S. Cl.
CPC ........ *B62D 15/027* (2013.01); *B62D 15/021* (2013.01); *G01S 15/931* (2013.01); *G06K 9/00791* (2013.01); *G08G 1/168* (2013.01); *B60R 2300/108* (2013.01)

(58) Field of Classification Search
None
See application file for complete search history.

(56) References Cited

U.S. PATENT DOCUMENTS

| | | |
|---|---|---|
| 6,587,186 B2 | 7/2003 | Bamji et al. |
| 6,674,895 B2 | 1/2004 | Rafii et al. |
| 6,678,039 B2 | 1/2004 | Charbon |
| 6,690,268 B2 | 2/2004 | Schofield et al. |
| 6,690,354 B2 | 2/2004 | Sze |
| 6,710,770 B2 | 3/2004 | Tomasi et al. |
| 6,825,455 B1 | 11/2004 | Schwarte |
| 6,876,775 B2 | 4/2005 | Torunoglu |

(Continued)

FOREIGN PATENT DOCUMENTS

WO WO2011/090484 7/2011

*Primary Examiner* — Leon-Viet Nguyen
(74) *Attorney, Agent, or Firm* — Honigman Miller Schwartz and Cohn, LLP

(57) ABSTRACT

A trailer angle detection system for a vehicle includes a camera disposed at a rear portion of the vehicle and viewing rearward of the vehicle. A plurality of ultrasonic sensors is disposed at the rear portion of the vehicle and sense rearward of the vehicle. A control has at least one processor operable to process image data captured by the camera. Responsive to processing of image data captured by the camera, the control detects a trailer rearward of the vehicle and in the field of view of the camera. The at least one processor is operable to process sensor data captured by the ultrasonic sensors to determine a distance to portions of the trailer rearward of the vehicle. Responsive to processing of captured image data and processing of captured sensor data, the trailer angle detection system is operable to determine an angle of the trailer relative to the vehicle.

15 Claims, 3 Drawing Sheets

(56) References Cited

U.S. PATENT DOCUMENTS

| | | |
|---|---|---|
| 6,906,793 B2 | 6/2005 | Bamji et al. |
| 6,919,549 B2 | 7/2005 | Bamji et al. |
| 7,053,357 B2 | 5/2006 | Schwarte |
| 7,157,685 B2 | 1/2007 | Bamji et al. |
| 7,176,438 B2 | 2/2007 | Bamji et al. |
| 7,203,356 B2 | 4/2007 | Gokturk et al. |
| 7,212,663 B2 | 5/2007 | Tomasi |
| 7,283,213 B2 | 10/2007 | O'Connor et al. |
| 7,310,431 B2 | 12/2007 | Gokturk et al. |
| 7,321,111 B2 | 1/2008 | Bamji et al. |
| 7,340,077 B2 | 3/2008 | Gokturk et al. |
| 7,352,454 B2 | 4/2008 | Bamji et al. |
| 7,375,803 B1 | 5/2008 | Bamji |
| 7,379,100 B2 | 5/2008 | Gokturk et al. |
| 7,379,163 B2 | 5/2008 | Rafii et al. |
| 7,405,812 B1 | 7/2008 | Bamji |
| 7,408,627 B2 | 8/2008 | Bamji et al. |
| 8,013,780 B2 | 9/2011 | Lynam |
| 8,027,029 B2 | 9/2011 | Lu et al. |
| 9,036,026 B2 | 5/2015 | Dellantoni et al. |
| 9,085,261 B2 | 7/2015 | Lu et al. |
| 9,146,898 B2 | 9/2015 | Ihlenburg et al. |
| 2010/0245066 A1 | 9/2010 | Sarioglu et al. |
| 2014/0085472 A1 | 3/2014 | Lu et al. |
| 2014/0160276 A1 | 6/2014 | Pliefke et al. |
| 2015/0002670 A1 | 1/2015 | Bajpai |
| 2015/0124096 A1 | 5/2015 | Koravadi |
| 2015/0158499 A1 | 6/2015 | Koravadi |
| 2015/0217693 A1 | 8/2015 | Pliefke et al. |
| 2015/0251599 A1 | 9/2015 | Koravadi |
| 2015/0352953 A1 | 12/2015 | Koravadi |
| 2016/0052548 A1* | 2/2016 | Singh ............... B60D 1/36 701/37 |
| 2016/0210853 A1 | 7/2016 | Koravadi |
| 2016/0280261 A1* | 9/2016 | Kyrtsos ............ G01H 17/00 |
| 2016/0381571 A1 | 12/2016 | Koravadi et al. |
| 2017/0050672 A1 | 2/2017 | Gieseke et al. |
| 2017/0217372 A1 | 8/2017 | Lu et al. |
| 2017/0222311 A1 | 8/2017 | Hess et al. |
| 2017/0254873 A1 | 9/2017 | Koravadi |
| 2017/0276788 A1 | 9/2017 | Wodrich |
| 2017/0315231 A1 | 11/2017 | Wodrich |
| 2017/0320518 A1* | 11/2017 | Lavoie ............... B62D 13/06 |

\* cited by examiner

VEHICLE TRAILER ANGLE DETECTION SYSTEM USING ULTRASONIC SENSORS

CROSS REFERENCE TO RELATED APPLICATION

The present application claims the filing benefits of U.S. provisional application Ser. No. 62/337,575, filed May 17, 2016, which is hereby incorporated herein by reference in its entirety.

FIELD OF THE INVENTION

The present invention relates generally to trailer angle detection systems for vehicles.

BACKGROUND OF THE INVENTION

Trailer angle determination is an important aspect to control the path of the trailer as well as jack knife determination algorithms. In the prior art the, trailer angle determination utilizes installation of a target image on the trailer tongue frame and the user needs to enter the measurements of the target location to the trailer angle determination algorithm.

SUMMARY OF THE INVENTION

The present invention provides a driver assistance system or trailer angle detection system for a vehicle that utilizes ultrasonic sensors of the vehicle to determine the trailer angle of the towed trailer relative to the vehicle. The present invention comprises a method and system that utilizes one or more ultrasonic sensors and a camera to estimate the trailer angle without requiring a target image at the trailer.

An ultrasonic sensor array may be mounted at the vehicle and sensing or facing rearwards, such as used for the parking assist or collision alert feature or functions. When a trailer is attached to the vehicle, these ultrasonic sensors could be used to estimate the distance map of the trailer tongue frame location, which is typically of triangular shape, and the rear backup camera can use this triangular shape information and estimate the orientation of the trailer tongue with respect to the vehicle. By correlating, fusing and tracking the trailer tongue frame orientation estimation from camera and the ultrasonic distance map estimation, the system of the present invention can determine the trailer angle with no target image.

These and other objects, advantages, purposes and features of the present invention will become apparent upon review of the following specification in conjunction with the drawings.

LEGEND

100—Vehicle equipped with ultrasonic, rear camera sensors and ECUs
102—Rear camera ECU
104—Rear camera module
106—UPA ECU
108-$a$ to 108-$d$—Ultrasonic sonic sensors
110—Vehicle bus
112—Camera field of view
200—Trailer
202—Trailer tongue frame
204—Ultrasonic sensor distance measurement cluster of trailer tongue frame
206—Estimated trailer angle
300—ultrasonic data pre-processing
302—camera data pre-processing
304—trailer tongue detection utilizing camera
307—tongue frame distance estimation
308—trailer angle estimation utilizing ultrasonic distance cluster measurement
310—trailer angle detection output
314—trailer tongue angle estimation utilizing camera data
316—trailer angle detection output (Camera)
318—data fusion and tracking
320—fused trailer angle output

DESCRIPTION OF THE PREFERRED EMBODIMENTS

A vehicle vision system and/or driver assist system and/or object detection system and/or alert system operates to capture images exterior of the vehicle and may process the captured image data to display images and to detect objects at or near the vehicle and in the predicted path of the vehicle, such as to assist a driver of the vehicle in maneuvering the vehicle in a rearward direction. The vision system includes an image processor or image processing system that is operable to receive image data from one or more cameras and provide an output to a display device for displaying images representative of the captured image data. Optionally, the vision system may provide display, such as a rearview display or a top down or bird's eye or surround view display or the like.

Figure 1:
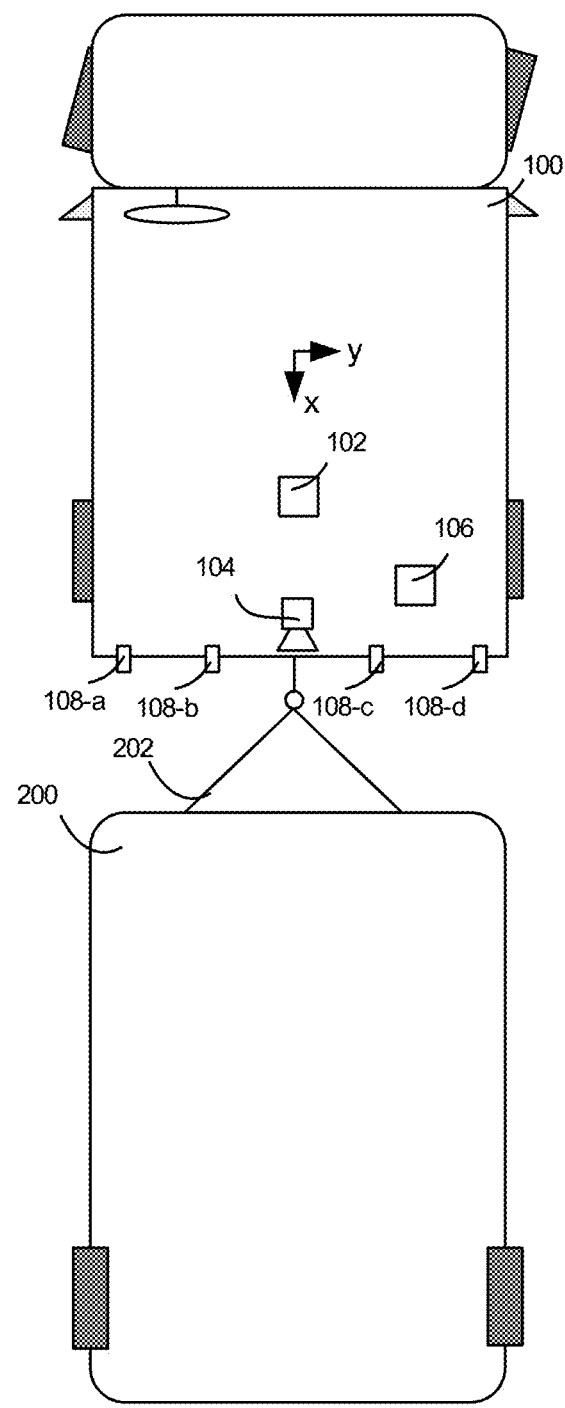
FIG. 1 is a plan view of a vehicle towing a trailer with the vehicle having sensing devices including ultrasonic sensors and a rear backup camera in accordance with the present invention.

FIG. 1 illustrates the view of trailer attached to the vehicle and equipped with ultrasonic sensors 108-$a$ to 108-$d$ mounted at the rear end portion of the vehicle 100, with a backup camera 104 at the rear portion of the vehicle and viewing rearward of the vehicle. The system includes a UPA (ultrasonic park assist) ECU 106 and a camera ECU 102. The trailer 200 includes a trailer tongue frame 202 which, in general, will be triangular in shape.

Figure 2:
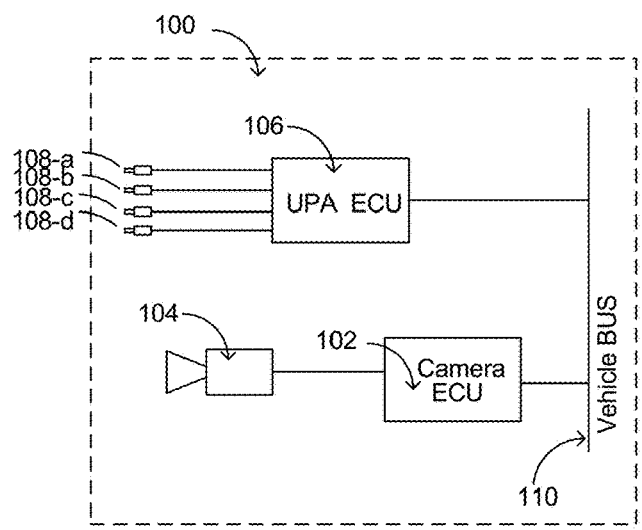
FIG. 2 is a system architecture diagram of the ultrasonic sensors, rear camera and ECUs of the system of the present invention.

FIG. 2 illustrates the system architecture diagram of the major components of the target less trailer angle detection system, comprising ultrasonic sensors 108-$a$ to 108-$d$ connected to the UPA ECU 106 that process the ultrasonic data and determines the distance of the trailer tongue frame 202. The UPA ECU 106 is connected to the camera ECU 102 via vehicle BUS communication network 110. The camera ECU 102 is connected to the rear camera unit 104, and processes the image data captured by the rear camera 104 to estimate the trailer tongue frame 102 angle. The fusion of the trailer angle detected by the camera 104 and the ultrasonic sensor 108-*a* to 108-*d* can be performed in the camera ECU 102 or UPA ECU 106.

Figure 3:
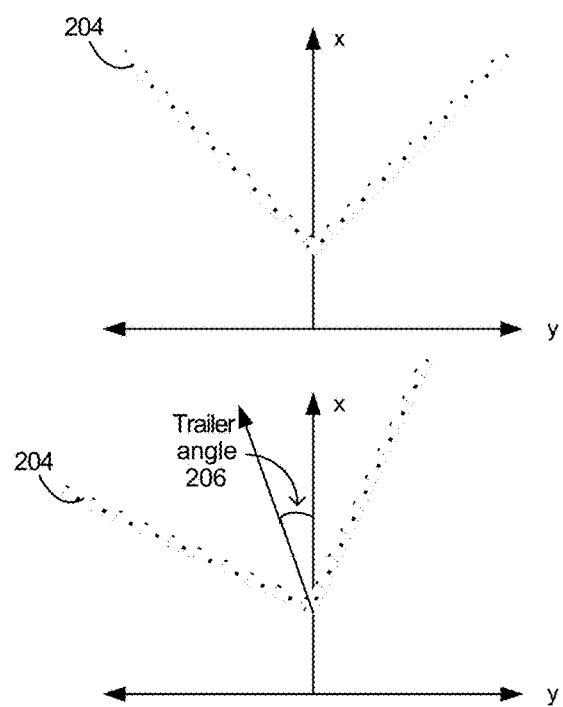
FIG. 3 illustrates an ultrasonic measurement output of the cluster of distance measurement of the trailer tongue frame location.
Figure 4:
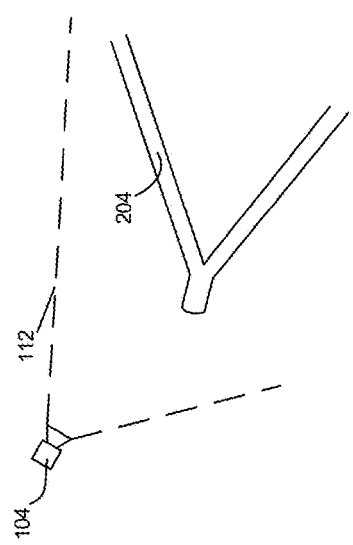
FIG. 4 illustrates the view of the trailer tongue frame in the rear camera's field of view.
Figure 5:
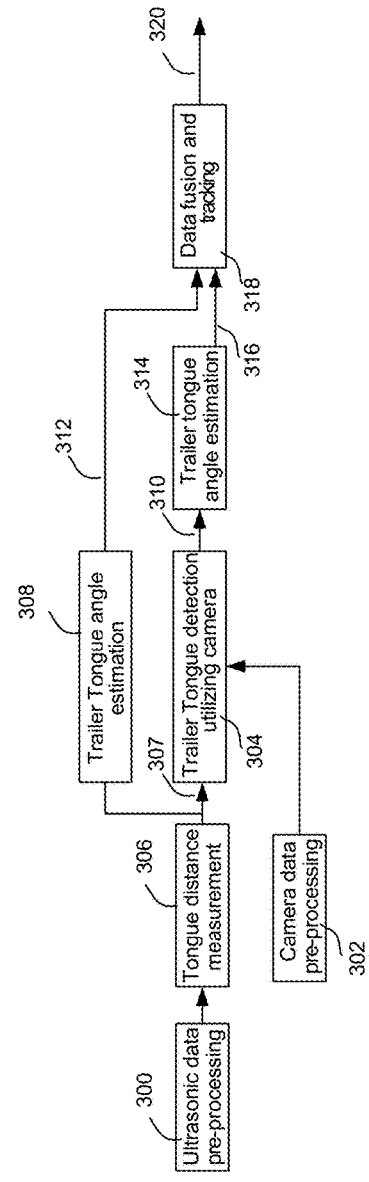
FIG. 5 is a data flow diagram for the trailer angle detection system utilizing the ultrasonic sensors and rear cameras in accordance with the present invention.

FIGS. 3-5 illustrate the trailer tongue angle detection algorithm in which the UPA ECU utilizes the multiple ultrasonic sensor array 108*a-d* to estimate the tongue frame location based on the cluster of the ultrasonic distance measurements 204, as shown in FIG. 3. The camera ECU 102 uses the location cluster estimate of the trailer tongue frame that is the output of the UPA ECU 106 to detect the trailer tongue frame in the image as the camera could see the tongue frame 204 as shown in FIG. 4.

As shown in FIG. 5, the ultrasonic data is pre-processed (at 300) and a tongue distance measurement is made (at 306). The camera data is also pre-processed at 302. Trailer tongue detection is done at 304 and is responsive to the camera data pre-processing 302 and the tongue distance measurement 306 (as received via communication link 307). Trailer tongue angle estimation 308 is done responsive to the tongue distance measurement. The camera ECU 102 estimates the trailer tongue angle 314 utilizing the trailer frame detection output 310. The data fusion block 318 fuses and tracks the trailer angle estimation data 312 and 314 and generates an output 320.

Thus, the system of the present invention is operable to determine a trailer angle of a trailer responsive to ultrasonic sensors at the rear of the vehicle (and/or optionally at the front of the trailer) and responsive to a rearward viewing backup camera at the rear of the vehicle. The system utilizes existing park assist ultrasonic sensors and an existing rear backup camera, and processes outputs of the sensors and camera to determine the angle of the trailer relative to the vehicle. The image data captured by the rear camera and the sensor data captured by the ultrasonic sensors may be processed and fused to determine the trailer angle and distance to the trailer (such as for when the trailer is not attached at the vehicle).

The system may utilize aspects of the trailer systems described in U.S. Pat. Nos. 9,086,261 and/or 6,690,268, and/or U.S. Publication Nos. US-2017-0050672; US-2015-0217693; US-2014-0160276; US-2014-0085472 and/or US-2015-0002670, and/or U.S. patent application Ser. No. 15/446,220, filed Mar. 1, 2017 and published Sep. 7, 2017 as U.S. Publication No. US-2017-0254873, and/or Ser. No. 15/421,482, filed Feb. 1, 2017 and published Aug. 3, 2017 as U.S. Publication No. US-2017-0217372, which are hereby incorporated herein by reference in their entireties. Optionally, the system may communicate with other systems utilizing aspects of the systems described in U.S. Publication Nos. US-2016-0381571; US-2016-0210853; US-2015-0158499; US-2015-0124096; US-2015-0251599 and/or US-2015-0352953, which are all hereby incorporated herein by reference in their entireties.

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in International Publication Nos. WO 2013/081984 and/or WO 2013/081985, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an image processing chip selected from the EyeQ family of image processing chips available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The camera system or camera module of the present invention may utilize aspects of the systems and/or modules described in International Publication Nos. WO 2013/123161 and/or WO 2013/019795, and/or U.S. Pat. Nos. 8,256,821; 7,480,149; 7,289,037; 7,004,593; 6,824,281; 6,690,268; 6,445,287; 6,428,172; 6,420,975; 6,326,613; 6,278,377; 6,243,003; 6,250,148; 6,172,613 and/or 6,087,953, and/or U.S. Publication Nos. US-2015-0327398; US-2014-0226012 and/or US-2009-0295181, which are all hereby incorporated herein by reference in their entireties. Optionally, the vision system may include a plurality of exterior facing imaging sensors or cameras, such as a rearward facing imaging sensor or camera, a forward facing camera at the front of the vehicle, and sideward/rearward facing cameras at respective sides of the vehicle, which capture image data representative of the scene exterior of the vehicle.

The vehicle may include any type of sensor or sensors, such as imaging sensors or radar sensors or lidar sensors or ladar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. Preferably, the imaging array has at least 300,000 photosensor elements or pixels, more preferably at least 500,000 photosensor elements or pixels and more preferably at least 1 million photosensor elements or pixels. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 8,694,224; 7,005,974; 5,760,962; 5,877,897; 5,796,094; 5,949,331; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 7,881,496; 7,720,580; 7,038,577; 6,882,287; 5,929,786 and/or 5,786,772, which are all hereby incorporated herein by reference in their entireties. The system may communicate with other communication systems via any suitable means, such as by utilizing aspects of the systems described in International Publication Nos. WO/2010/144900; WO 2013/043661 and/or WO 2013/081985, and/or U.S. Publication No. US-2012-0062743, which are hereby incorporated herein by reference in their entireties.

The imaging device and control and image processor and any associated illumination source, if applicable, may comprise any suitable components, and may utilize aspects of the cameras (such as various imaging sensors or imaging array sensors or cameras or the like, such as a CMOS imaging array sensor, a CCD sensor or other sensors or the like) and vision systems described in U.S. Pat. Nos. 5,760,962; 5,715,093; 6,922,292; 6,757,109; 6,717,610; 6,590,719; 6,201,642; 5,796,094; 6,559,435; 6,831,261; 6,822,563; 6,946,978; 7,720,580; 8,542,451; 7,965,336; 7,480,149; 5,550,677; 5,877,897; 6,498,620; 5,670,935; 5,796,094; 6,396,397; 6,806,452; 6,690,268; 7,005,974; 7,937,667; 7,123,168; 7,004,606; 6,946,978; 7,038,577; 6,353,392; 6,320,176; 6,313,454 and/or 6,824,281, and/or International Publication Nos. WO 2009/036176; WO 2009/046268; WO 2010/099416; WO 2011/028686 and/or WO 2013/016409, and/or U.S. Pat. Publication Nos. US 2010-0020170 and/or US-2009-0244361, which are all hereby incorporated herein by reference in their entireties.

The system may utilize aspects of the trailering or trailer angle detection systems described in U.S. Pat. Nos. 9,085,261 and/or 6,690,268, and/or U.S. Publication Nos. US-2017-0050672; US-2015-0217693; US-2014-0160276; US-2014-0085472 and/or US-2015-0002670, and/or U.S. patent application Ser. No. 15/421,482, filed Feb. 1, 2017 and published Aug. 3, 2017 as U.S. Publication No. US-2017-0217372, and/or Ser. No. 15/446,220, filed Mar. 1, 2017 and published Sep. 7, 2017 as U.S. Publication No. US-2017-0254873, which are hereby incorporated herein by reference in their entireties.

The system may utilize sensors, such as radar or lidar sensors or the like. The sensing system may utilize aspects of the systems described in U.S. Pat. Nos. 9,146,898; 9,036,026; 8,027,029; 8,013,780; 6,825,455; 7,053,357; 7,408,627; 7,405,812; 7,379,163; 7,379,100; 7,375,803; 7,352,454; 7,340,077; 7,321,111; 7,310,431; 7,283,213; 7,212,663; 7,203,356; 7,176,438; 7,157,685; 6,919,549; 6,906,793; 6,876,775; 6,710,770; 6,690,354; 6,678,039; 6,674,895 and/or 6,587,186, and/or International Publication No. WO 2011/090484 and/or U.S. Publication No. US-2010-0245066 and/or U.S. patent application Ser. No. 15/584,265, filed May 2, 2017 and published Nov. 2, 2017 as U.S. Publication No. US-2017-0315231, Ser. No. 15/467,247, filed Mar. 23, 2017 and published Sep. 28, 2017 as U.S. Publication No. US-2017-0276788, Ser. No. 15/446,220, filed Mar. 1, 2017 and published Sep. 7, 2017 as U.S. Publication No. US-2017-0254873, and/or Ser. No. 15/420,238, filed Jan. 31, 2017 and published Aug. 3, 2017 as U.S. Publication No. US-2017-0222311, and/or U.S. provisional applications, Ser. No. 62/375,161, filed Aug. 15, 2016, Ser. No. 62/361,586, filed Jul. 13, 2016, Ser. No. 62/359,913, filed Jul. 8, 2016, and/or Ser. No. 62/349,874, filed Jun. 14, 2016, which are hereby incorporated herein by reference in their entireties.

Optionally, the vision system may include a display for displaying images captured by one or more of the imaging sensors for viewing by the driver of the vehicle while the driver is normally operating the vehicle. Optionally, for example, the vision system may include a video display device, such as by utilizing aspects of the video display systems described in U.S. Pat. Nos. 5,530,240; 6,329,925; 7,855,755; 7,626,749; 7,581,859; 7,446,650; 7,338,177; 7,274,501; 7,255,451; 7,195,381; 7,184,190; 5,668,663; 5,724,187; 6,690,268; 7,370,983; 7,329,013; 7,308,341; 7,289,037; 7,249,860; 7,004,593; 4,546,551; 5,699,044; 4,953,305; 5,576,687; 5,632,092; 5,708,410; 5,737,226; 5,802,727; 5,878,370; 6,087,953; 6,173,501; 6,222,460; 6,513,252 and/or 6,642,851, and/or U.S. Publication Nos. US-2014-0022390; US-2012-0162427; US-2006-0050018 and/or US-2006-0061008, which are all hereby incorporated herein by reference in their entireties. Optionally, the vision system (utilizing the forward viewing camera and a rearward viewing camera and other cameras disposed at the vehicle with exterior fields of view) may be part of or may provide a display of a top-down view or bird's-eye view system of the vehicle or a surround view at the vehicle, such as by utilizing aspects of the vision systems described in International Publication Nos. WO 2010/099416; WO 2011/028686; WO 2012/075250; WO 2013/019795; WO 2012/075250; WO 2012/145822; WO 2013/081985; WO 2013/086249 and/or WO 2013/109869, and/or U.S. Publication No. US-2012-0162427, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A trailer angle detection system, for a vehicle, said trailer angle detection system comprising:
    a camera disposed at a rear portion of a vehicle and viewing rearward of the vehicle, said camera capturing image data;
    a plurality of ultrasonic sensors disposed at a rear portion of the vehicle and sensing rearward of the vehicle, said ultrasonic sensors capturing sensor data;
    a control having at least one processor operable to process image data captured by said camera;
    wherein, responsive at least in part to processing by said at least one processor of image data captured by said camera, said control detects a trailer rearward of the vehicle and in the field of view of said camera;
    wherein said at least one processor is operable to process sensor data captured by said ultrasonic sensors to determine distances to portions of the trailer rearward of the vehicle;
    wherein, responsive at least in part to processing of captured image data and processing of captured sensor data, said trailer angle detection system is operable to determine an angle of the trailer relative to the vehicle;
    wherein said ultrasonic sensors are part of a parking assist feature or collision alert feature of the vehicle;
    wherein said ultrasonic sensors are used to estimate a distance map of the trailer tongue location, and wherein said trailer angle detection system uses the distance map to estimate a first estimated trailer tongue angle; and
    wherein said trailer angle detection system uses triangular shape information of the trailer tongue, as determined by image processing of captured image data, to estimate the orientation of the trailer tongue with respect to the vehicle and to estimate a second estimated trailer tongue angle.

2. The trailer angle detection system of claim 1, wherein an output of said at least one processor responsive to processing of captured image data and an output of said at least one processor responsive to processing of captured sensor data are fused.

3. The trailer angle detection system of claim 1, wherein said trailer angle detection system is operable to determine the angle of the trailer relative to the vehicle and a location of the trailer relative to the vehicle to assist the driver in maneuvering the vehicle towards the trailer to hitch the trailer to the vehicle.

4. The trailer angle detection system of claim 1, wherein said control correlates, fuses and tracks the first and second estimated trailer tongue angles to determine the angle of the trailer relative to the vehicle.

5. The trailer angle detection system of claim 1, wherein said system determines the angle of the trailer relative to the vehicle without a target image on the trailer.

6. A trailer angle detection system, for a vehicle, said trailer angle detection system comprising:
  a camera disposed at a rear portion of a vehicle and viewing rearward of the vehicle, said camera capturing image data;
  a plurality of ultrasonic sensors disposed at a rear portion of the vehicle and sensing rearward of the vehicle, said ultrasonic sensors capturing sensor data;
  a control having an image processor operable to process image data captured by said camera;
  wherein, responsive at least in part to processing by said image processor of image data captured by said camera, said control detects a trailer rearward of the vehicle and in the field of view of said camera;
  a sensor processor operable to process sensor data captured by said ultrasonic sensors to determine distances to portions of the trailer rearward of the vehicle;
  wherein, responsive at least in part to processing by said image processor of captured image data and processing by said sensor processor of captured sensor data, said trailer angle detection system is operable to determine an angle of the trailer relative to the vehicle;
  wherein said ultrasonic sensors are part of a parking assist feature or collision alert feature of the vehicle; and
  wherein said ultrasonic sensors are used to estimate a distance map of the trailer tongue location, and wherein said trailer angle detection system uses the distance map to estimate a first estimated trailer tongue angle, and wherein said trailer angle detection system uses triangular shape information of the trailer tongue, as determined by image processing of captured image data, to estimate the orientation of the trailer tongue with respect to the vehicle and to estimate a second estimated trailer tongue angle.

7. The trailer angle detection system of claim 6, wherein an output of said sensor processor responsive to processing of captured sensor data and an output of said image processor responsive to processing of captured image data are fused.

8. The trailer angle detection system of claim 6, wherein said trailer angle detection system is operable to determine the angle of the trailer relative to the vehicle and a location of the trailer relative to the vehicle to assist the driver in maneuvering the vehicle towards the trailer to hitch the trailer to the vehicle.

9. The trailer angle detection system of claim 6, wherein said control correlates, fuses and tracks the first and second estimated trailer tongue angles to determine the angle of the trailer relative to the vehicle.

10. The trailer angle detection system of claim 6, wherein said system determines the angle of the trailer relative to the vehicle without a target image on the trailer.

11. A trailer angle detection system for a vehicle, said trailer angle detection system comprising:
  a camera disposed at a central rear portion of a vehicle and viewing rearward of the vehicle, said camera capturing image data;
  a plurality of ultrasonic sensors disposed at a rear portion of the vehicle and sensing rearward of the vehicle, said ultrasonic sensors capturing sensor data, wherein said plurality of ultrasonic sensors comprises at least three ultrasonic sensors that are laterally spaced apart at the rear portion of the vehicle;
  a control having at least one processor operable to process image data captured by said camera;
  wherein, responsive at least in part to processing by said at least one processor of image data captured by said camera, said control detects a trailer rearward of the vehicle and in the field of view of said camera;
  wherein said at least one processor is operable to process sensor data captured by said ultrasonic sensors to determine distances to portions of the trailer rearward of the vehicle; and
  wherein said ultrasonic sensors are used to estimate a distance map of the trailer tongue location, and wherein said trailer angle detection system uses the distance map to estimate a first estimated trailer tongue angle, and wherein said trailer angle detection system uses triangular shape information of the trailer tongue, as determined by image processing of captured image data, to estimate the orientation of the trailer tongue with respect to the vehicle and to estimate a second estimated trailer tongue angle; and
  wherein said control correlates, fuses and tracks the first and second estimated trailer tongue angles to determine the angle of the trailer relative to the vehicle.

12. The trailer angle detection system of claim 11, wherein an output of said at least one processor responsive to processing of captured image data and an output of said at least one processor responsive to processing of captured sensor data are fused.

13. The trailer angle detection system of claim 11, wherein said trailer angle detection system is operable to determine the angle of the trailer relative to the vehicle and a location of the trailer relative to the vehicle to assist the driver in maneuvering the vehicle towards the trailer to hitch the trailer to the vehicle.

14. The trailer angle detection system of claim 11, wherein said ultrasonic sensors are part of a parking assist feature or collision alert feature of the vehicle.

15. The trailer angle detection system of claim 11, wherein said system determines the angle of the trailer relative to the vehicle without a target image on the trailer.

* * * * *

UNITED STATES PATENT AND TRADEMARK OFFICE
CERTIFICATE OF CORRECTION

PATENT NO. : 10,040,481 B2  
APPLICATION NO. : 15/596350  
DATED : August 7, 2018  
INVENTOR(S) : Krishna Koravadi Page 1 of 1

It is certified that error appears in the above-identified patent and that said Letters Patent is hereby corrected as shown below:

In the Claims

<u>Column 6</u>
Claim 1, Line 31, "A trailer angle detection system, for a vehicle, said" should be --A trailer angle detection system for a vehicle, said--

<u>Column 7</u>
Claim 6, Line 17, "A trailer angle detection system, for a vehicle, said" should be --A trailer angle detection system for a vehicle, said--

Signed and Sealed this
Thirteenth Day of November, 2018

Andrei Iancu
*Director of the United States Patent and Trademark Office*